Patented Dec. 4, 1951

2,577,018

UNITED STATES PATENT OFFICE 2,577,018

$\Delta^{17,20}$-PREGNENOLAL DERIVATIVES

Edward C. Kendall and Gerard A. Fleisher, Rochester, Minn., assignors to Research Corporation, New York, N. Y., a corporation of New York No Drawing. Application November 20, 1950,
Serial No. 196,701

5 Claims. (Cl. 260—397.4)

This invention relates to steroids useful in the synthesis of adrenal cortical hormones and particularly to steroids having a glyoxal side chain at C-17 of the steroid ring system and to the ketol derivatives thereof.

The new compounds of the invention include glyoxals of the general formula (A)
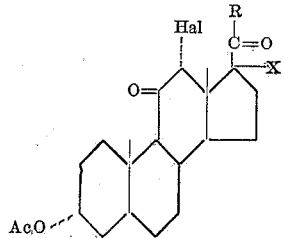

wherein R is a member of the group consisting of —CH(OH)$_2$, —CHO and the organic carboxylic acid esters and lower alkyl acetals thereof, X is a member of the group consisting of hydrogen and bromine, Hal is a member of the group consisting of chlorine and bromine, and Ac is an organic carboxylic acid radical, and compounds of the general formula (B)
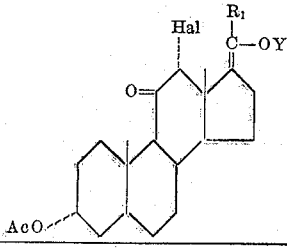

wherein Hal and Ac are as defined above, R$_1$ is a member of the group consisting of —CHO and —CH(OAc)$_2$, and Y is a member of the group consisting of hydrogen and organic carboxylic acid radicals.

The novel methods of the invention include the reaction of bromine with a 3($\alpha$),21-diacyloxy-11,20-diketo-12($\alpha$)halopregnane in approximately equimolecular proportions to produce a 3($\alpha$),21-diacyloxy - 11,20-diketo-12($\alpha$),21-dihalopregnane, and the reaction of a 3($\alpha$),21-diacyloxy-11,20-diketo-12($\alpha$)-halopregnane with a large excess of bromine to form the corresponding 17-haloglyoxals.

The invention also comprises the method of converting compounds of Formula A wherein X is hydrogen into compounds of Formula B by treatment with an organic nitrogen base such as pyridine, collidine and quinoline, and the method of converting compounds of Formula A wherein R is —CHO and X is bromine into compounds of Formula B by treatment with an alkali metal bisulfite.

The compounds and methods of the invention are illustrated by the following flow sheet. In the compounds illustrated in the flow sheet the acyl group Ac may be any organic carboxylic acid, the lower fatty acids such as acetic and propionic acids being particularly suitable, and bromine may be replaced by chlorine.

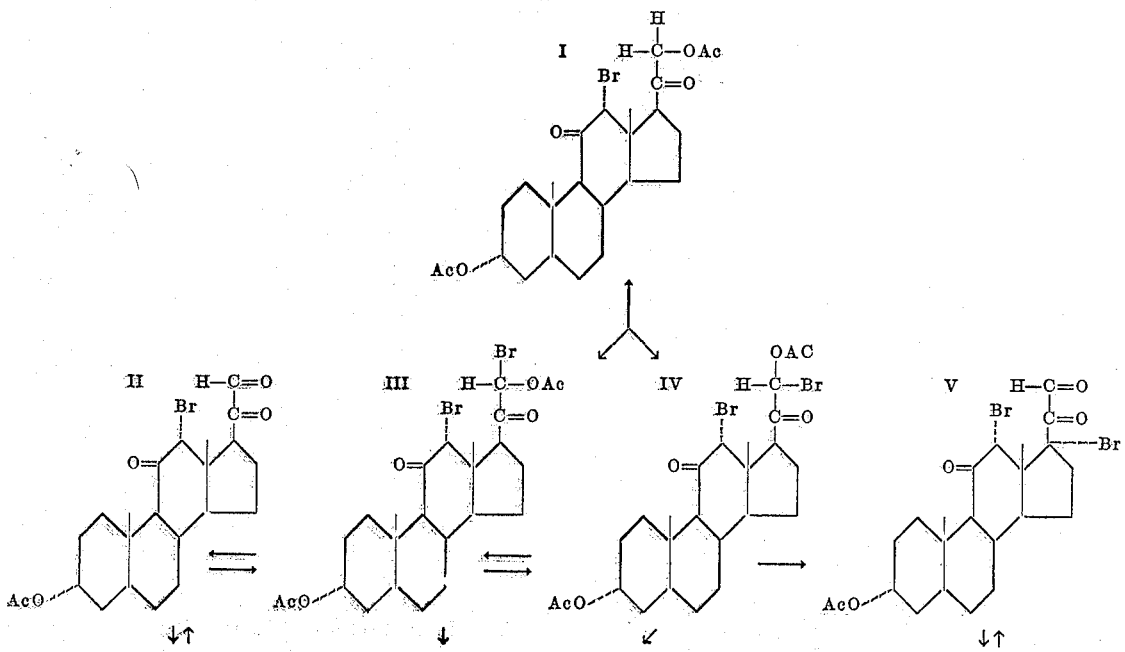

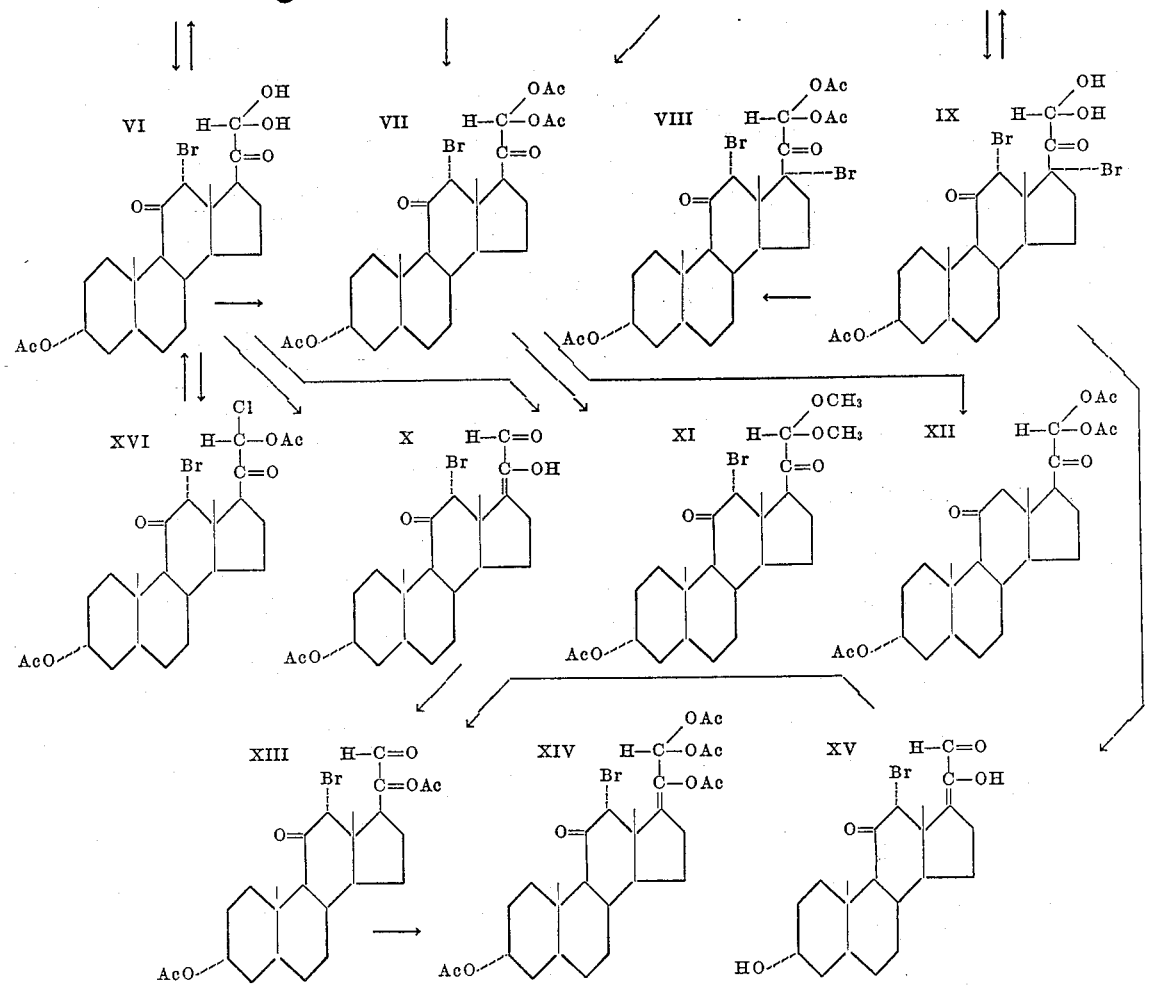

When 3(a),21-diacetoxy - 11,20 - diketo-12(a)-bromopregnane (I) is brominated with one mole of bromine in dry chloroform at 0° with gaseous HBr as the catalyst, the reaction is complete in 4 hours and practically all of the material can be separated in crystalline form. Recrystallization from chloroform-ligroin reveals the presence of two isomeric compounds. The less soluble one, here referred to as bromide $a$ (compound III), is present in somewhat larger amounts. It crystallizes in flat plates, M. P. 180–182°, with a strong decomposition. $(a)_D + 139°$ ($c=1$ in chloroform); $+133°$ ($c=1$ in HOAc). $\lambda$ max. 312.5 m$\mu$, $\Sigma=276$ (chloroform). Analysis shows that one additional bromine atom has entered the molecule.

The more soluble compound, bromide $b$ (compound IV), crystallizes in prismatic needles. The pure crystals melt at 147–48°, resolidify, and melt again at 167–173° with strong decomposition. $(a)_D - 94°$ ($c=1$ in chloroform); $-73°$ ($c=1$ in HOAc). $\lambda$ max. 313.5 m$\mu$, $\Sigma=304$ (chloroform). Analysis shows bromide $b$ to be isomeric with bromide $a$.

In the process of separation the rotation of the mother liquors containing bromide $b$ changes in a positive direction on standing and more bromide $a$ can then be separated. Also, if impure bromide $a$ is kept in solution longer than usual its rotation decreases. It is not known what impurity catalyzes this mutarotation, but it can be demonstrated that HBr has such an effect. A change in specific rotation of both pure compounds occurs in glacial acetic acid N/10 with HBr at 33° C. Equilibrium is reached when about 60 per cent of bromide $a$ and 40 per cent of bromide $b$ are present.

In order to determine the position of the newly entered bromine in both compounds (bromide $a$ and bromide $b$), the following substitution reactions were carried out (it could be assumed from experience that the original bromine in position 12 would not enter into these reactions):

(1) Reduction with sodium iodide and acetic acid. In both compounds the newly entered bromine atom reacts remarkably fast with sodium iodide in glacial acetic acid and 3(a),21-diacetoxy-11,20-diketo-12(a)-bromopregnane (I) can be recovered in practically quantitative yield.

(2) Replacement with the acetoxy group. When either bromide $a$ or bromide $b$ is dissolved in a mixture of benzene and glacial acetic acid and shaken with excess silver acetate for 2 days, 3(a),21,21 - triacetoxy - 11,20 - diketo - 12(a)-bromo-pregnane (VII) is obtained in 88 and 89% yield, M. P. 169.5–170.5°; $(a)_D + 35°$ ($c\sim 1$ in CHCl$_3$), $\lambda$ max. 310 m$\mu$, $\Sigma=190$ (MeOH). This substance reduces both ammoniacal silver nitrate and phosphomolybdic acid but less intensely than the ketol acetate (I).

With sodium acetate in acetic acid the same compound (VII) is obtained from I but in smaller yields. The triacetate is completely debrominated with zinc and acetic acid to 3(a),21,21-triacetoxy-11,20-diketopregnane (XII) which crystallizes from a little MeOH in short rods, M. P. 115–16°. $(a)_D + 117°$ ($c=1$ in CHCl$_3$).

When 3(a),21,21 - triacetoxy - 11,20 - diketo-12(a)-bromopregnane (VII) is heated in methanolic HCl and subsequently reacetylated at C-3, 3(α) - acetoxy - 21,21 - dimethoxy - 11,20-diketo-12(α)bromopregnane (XI) is obtained in 80% yield. It crystallizes in long, fine needles, M. P. 158-160°. $(\alpha)_D +30°$ ($c \sim 1$ in CHCl$_3$).

Hydrolysis: Both bromo compounds (bromide $a$ and bromide $b$) react with aqueous pyridine almost as fast as they go into solution. When such a solution of either bromo compound is poured into excess sulfuric acid and filtered, one equivalent of bromide ion is found in the filtrate. The precipitate can be crystallized quantitatively from aqueous acetone or aqueous acetic acid (needles). It has the properties of a hydrated glyoxal, in that it forms yellow solutions in anhydrous solvents such as benzene, glacial acetic acid, chloroform, etc., but colorless solutions in alcohols or aqueous solvents. The yellow color is due to the free glyoxal II which exhibits a small band at 440 m$\mu$, $\Sigma \sim 30$, where methyl glyoxal absorbs also. The compound reduces ammoniacal silver nitrate and liberates iodine from HOAc-NaI, though at a slower rate than the bromo compounds. The melting point of the hydrate is not sharp and depends on the rate of heating, as it loses water to give the glyoxal. When placed on the stage at 147° it melts at 149-51°. $(\alpha)_D^{30} +28.0°$ ($c \sim 1$ in CHCl$_3$). As the yellow color appears in the chloroform solution the rotation drops to $(\alpha)_D +26°$ (calculated as glyoxal). The compound is, therefore, formulated as 3(α)-acetoxy-21,21-dihydroxy-11,20-diketo-12(α)-bromopregnane (VI).

The free glyoxal II has not been obtained in crystalline form.

When the glyoxal hydrate VI is treated with methanolic HCl, followed by reacetylation, the dimethyl acetal (XI) is obtained which is identical with the product prepared from the triacetate VII. When the glyoxal hydrate VI is treated with acetic anhydride and a drop of concentrated H$_2$SO$_4$ the same triacetate VII is obtained, while treatment with acetyl bromide and H$_2$SO$_4$ yields a mixture of bromoacetates from which pure bromide $a$ (III) could be isolated ($(\alpha)_D +137°$, M. P. 180-82°). The total rotation of the reaction product suggested the presence of over 40% of bromide $b$ (compound IV), but in the attempted isolation it partially isomerized to bromide $a$ (compound III). That no other reactions occur with acetyl bromide is indicated by the observation that reduction of the whole product with sodium iodide in acetic acid gives an excellent yield of 3(α),21-diacetoxy-11,20-diketo-12(α)-bromopregnane (I).

It is believed that the foregoing reactions show that both bromo compounds III and IV are the C$_{21}$-diastereoisomers. This is also supported by a comparison of the optical rotations of related compounds.

When a pyridine solution of the glyoxal II or glyoxal hydrate VI is heated on the steam bath for one hour and the solvent then replaced with chloroform, an absorption band at 284 m$\mu$ is observed. It was subsequently found that more of the light absorbing material can be obtained by using a mixture of one part pyridine and four parts glacial acetic acid and heating at 60° for 16 hours. Further heating causes a gradual loss of the absorption after an optimum of about $\Sigma = 6,200$. The reaction also takes place at room temperature, but requires several days. Water is found to inhibit the reaction somewhat. Adsorption of the mixture on magnesium silicate-infusorial earth and elution with benzene leaves the non-absorbing material on the column and gives a crystalline product of M. P. 175-82° after removal of the benzene. Several recrystallizations from dilute acetone gives a product of M. P. 190-91° $(\alpha)_D +96°$ ($c = 0.86$ in chloroform), $\lambda$ max.=284 m$\mu$, $\Sigma = 13,650$ (chloroform); $\lambda$ max. 282 m$\mu$, $\Sigma = 12,500$ (MeOH).

This product reduces ammoniacal silver solution and showed a greenish brown color when a drop of alcohol FeCl$_3$ solution is added to its solution in alcohol. With tetranitromethane it gives a weakly positive reaction. In chloroform solution it reacts with 1 mole of bromine within 15 minutes. These tests, the absorption curve and the analysis show that this compound is the enol derivative of the glyoxal, i. e., 3(α)-acetoxy - 20 - hydroxy - 11 - keto - 12(α)-bromo-$\Delta^{17,20}$-pregnene-21-al (X).

On acetylation with pyridine-acetic anhydride the enol is converted to its acetyl derivative (XIII) of M. P. 162-64° (leaflets from dilute acetone). $(\alpha)_D +86°$ ($c \sim 1$ in chloroform), $\lambda$ max. =246 m$\mu$, $\Sigma = 12,500$ (ether). In methanol the absorption decreases continuously which may be due to acetal formation. The substance does not give the FeCl$_3$-reaction for free enol; it reduces ammoniacal silver nitrate and takes up bromine, though at a much slower rate than the free enol.

The shift of the absorption maximum on acetylation from 284 m$\mu$ to 246 m$\mu$ is again in keeping with the observations on the enol derivatives of α-diketones where in each case the enol acetate shows the normal absorption of an α-substituted α,β-unsaturated ketone.

The enol acetate (XIII) can be formed directly from either 21-bromo compound (III or IV) when treated with a mixture of equal parts of pyridine and glacial acetic acid, e. g. at room temperature for 2 days. Absorption analysis reveals that under such conditions there is formed over 30% of enol acetate together with a nearly equal amount of free enol while the remaining third does not absorb light and is perhaps polymerized glyoxal. When the glyoxal (II) is subjected to the same conditions, a similar amount of enol is formed, while the absorption band of the enol acetate is completely absent. This suggests that the enol is formed by way of the glyoxal, but that a different mechanism is involved in the formation of the enol acetate.

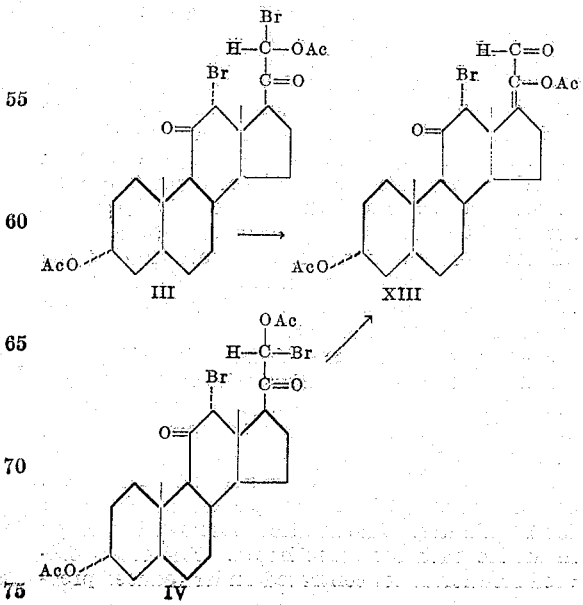

When the enol acetate XIII is treated with acetic anhydride and a drop of concentrated $H_2SO_4$, a good yield of 3,20,21,21-tetraacetoxy-11-keto-12($a$)-bromo-$\Delta^{17,20}$-pregnene (XIV) is obtained. After recrystallization, M. P. 154–55° (needles), $(a)_D +60°$ ($c\sim1$ in $CHCl_3$). The crystals do not give the enol reaction with $FeCl_3$. They absorb 1 mole of bromine within 3 hours.

When 3($a$),21 - diacetoxy-11,20-diketo-12($a$)-bromo-pregnene (I) is treated with a large excess of bromine and HBr in glacial acetic acid for 30 hours at 30°, a crystalline dibromo compound separates from the benzene extract in about 30% yield which has all the characteristics of a hydrated glyoxal. It forms yellow solutions in anhydrous solvents, but colorless solutions in methanol or aqueous solvents. The 17-bromo glyoxal V has not been separated in crystalline form but like the glyoxal II may be recovered as its hydrate IX. The yellow color is due to a small band at 423 m$\mu$, $\Sigma\sim40$. The melting point depends on the rate of heating. When the crystals are put on the hot stage at 203° they turn yellow immediately and melt with strong decomposition at 206–08°. $(a)_D -34.5°$ ($c\sim1$ in chloroform); the solution soon turns yellow and the rotation changes to $(a)_D -37°$ (calcd. as glyoxal). The compound analyzes as 3($a$)-acetoxy - 21,21 - dihydroxy - 11,20 - diketo - 12($a$),17-dibromopregnane (IX). When the crystals of IX are treated with acetic anhydride $H_2SO_4$ a crystalline derivative is obtained, M. P 167–69°, $(a)_D -24°$ ($c\sim1$ in chloroform). This is the 3($a$),21,21-triacetoxy-11,20-diketo-12($a$),-17-dibromopregnane (VIII).

When the 17 bromoglyoxal hydrate (IX) is heated in dilute methanol in the presence of excess $NaHSO_3$, crystals appear after a few minutes which exhibit an absorption maximum at 284 m$\mu$. After recrystallization from dilute acetone, M. P. 189.5–90°, $(a)_D +101°$ ($c\sim1$ in chloroform $\lambda$ max.$=284$ m$\mu$, $\Sigma=10,900$ (methanol); it analyzes as 3($a$),20 - dihydroxy - 11 - keto - 12($a$)-bromo-$\Delta^{17,20}$-pregnene-21-al (XV), and must be formed, therefore, by reductive removal of the bromine atom at C–17 together with hydrolysis at C–3.

Compound XVI may be produced from compound VI by treatment with acetyl chloride and compound XVI may be reconverted into compound VI by treatment with pyridine.

Details of the procedures outlined above are given in the following specific examples:

*Preparation of starting material, 3,21-diacetoxy-11,20-diketo-12-bromopregnane (I).*—3($a$),21-diacetoxy-11-keto- 12 -bromo-24,24-diphenyl-$\Delta^{20:22,23:24}$-choladiene is dissolved in ethyl acetate and treated with ozone at a temperature of —78° until approximately 2 moles of ozone have been absorbed. By this treatment the diene is broken at the bond 20,22 and the compound 3($a$),21-diacetoxy-11,20-diketo-12($a$)-bromopregnane crystallizes from solution. Recrystallization of the material from chloroform-methanol raises the melting point to 164–165°. (All rotations were taken in chloroform ($c\sim1$).)

*21-bromide a (III) and 21-bromide b (IV) from 3($a$),21-diacetoxy-11,20-diketo-12($a$)-bromopregnane (I).*—20.46 gm. 3($a$),21-diacetoxy-11,20-diketo-12($a$)-bromopregnane (40 mm.) dissolved in 400 cc. chloroform are cooled in an ice bath. To this is added 80 cc. of 1 N $Br_2$ in $CHCl_3$. With cooling, gaseous HBr is now passed into the flask for 10 minutes. The solution is allowed to stand in an ice bath for three hours. The straw-colored solution is concentrated under reduced pressure to a small volume, fresh chloroform added and again concentrated under reduced pressure. On adding much ligroin the material crystallizes in about 95% yield and shows a specific rotation, $(a)_D =+34°$. When dissolved in 40 cc. chloroform and 200 cc. of ligroin added about one-half of the material crystallizes, with $(a)_D =+106°$. After five recrystallizations in the same manner the rotation is constant at $(a)_D =+139°$. This compound, bromide $a$, crystallizes in flat plates, M. P. 180–182° with strong decomposition.

From the mother liquor of the first recrystallization the other half of the reaction product is obtained by removing most of the chloroform under reduced pressure and adding a large amount of ligroin. A specific rotation $(a)_D =-38°$ is found for this fraction. When it is recrystallized from a little chloroform and much ligroin its rotation finally reaches $(a)_D -94°$, after seven to nine recrystallizations. This compound, bromide $b$, crystallizes in prismatic needles, M. P. 147–48° with resolidification, then 167–73° with strong decomposition.

*3($a$),21,21 - triacetoxy - 11,20 - diketo - 12($a$)-bromopregnane (VII) from bromide a (III) and bromide b (IV) with silver acetate.*—590 mg. of either pure bromide $a$ or pure bromide $b$ is dissolved in 5 cc. benzene. 15 cc. glacial acetic acid and 334 mg. silver acetate are added and the mixture is agitated at room temperature for 45 hours. It is then filtered and washed with chloroform. The combined filtrates are washed with water, sodium bicarbonate solution and again with water and dried. The material which remains after removal of the chloroform is recrystallized from methanol, yielding from both bromide $a$ and bromide $b$ 88–89 per cent of pure 3($a$),21,21 - diacetoxy - 11,20 - diketo-12($a$)-bromopregnane, M. P. 169.5–170.5°, $(a)_D +35$. This compound reduces both ammoniacal silver nitrate and phosphomolybdic acid, but less intensely than the ketol acetate (I).

*3($a$),21,21 - triacetoxy - 11,20 - diketo - 12($a$)-bromopregnane (VII) from bromide a (III) and bromide b (IV) with sodium acetate.*—590 mg. of either pure bromide $a$ or bromide $b$ is mixed with 5 cc. of a M/3 sodium acetate solution in acetic acid and heated on the steam bath for 2 hours. Water is then added and the precipitate dissolved in chloroform. The latter is washed with water, sodium bicarbonate and water and dried. After removal of the chloroform under reduced pressure the residue is recrystallized several times from methanol until the melting point reaches 169.5–170.5°. This material gives no depression of its melting point when mixed with 3($a$),21,21-triacetoxy - 11,20 - diketo - 12($a$)-bromopregnane obtained by the silver acetate method. The yield of pure material is only about 60 per cent in spite of the quantitative removal of the bromine as judged by titration of the water washings.

*3($a$),21,21 - triacetoxy - 11,20 - diketopregnane (XII) from 3($a$),21,21-triacetoxy-11,20-diketo-12($a$)-bromopregnane (VII).*—3.0 g. triacetate VII is dissolved in 60 cc. glacial acetic acid. This is cooled with cold water and 3.0 g. zinc dust added. It is then allowed to stand at room temperature for 1 hour, filtered and the residue washed thoroughly with chloroform and water. The chloroform extract is washed with water, sodium bicarbonate and water, dried with sodium sulfate and evaporated. The residue crystallizes from a little methanol after seeding. Weight 2.445 gm. (95%) M. P. 115–16° (short rods). $(a)_D =+117°$.

3(α),acetoxy - 21,21 - dimethoxy - 11,20 - diketo-12(α)-bromopregnane (XI) from 3(α),21,21-triacetoxy -11,20 - diketo -12(α) - bromopregnane (VII).—5.695 gm. of 3.21,21-triacetoxy-11,20-diketo-12 (α)-bromopregnane and 160 cc. of N/4 HCl in MeOH is refluxed for 2 hours. After cooling the solution is mixed with 10 gm. K₂CO₃ in 20 cc. water and then concentrated in vacuum. Some more water is added and it is concentrated further. It is extracted with chloroform, washed two times with water, dried and evaporated. To re-establish the acetoxy group at C–3 the residue is dissolved in 20 cc. pyridine and 20 cc. acetic anhydride added. It is allowed to stand at room temperature overnight. The next morning ice is added. After 20 minutes it is filtered and washed thoroughly with water. The material crystallizes from dilute methanol in long, fine needles, weight 4.115 gm. (80 per cent), M. P. 153–58°. After two recrystallizations from dilute MeOH, the M. P. is constant at 157–59°. $(α)_D +30°$.

3(α) - acetoxy - 21,21-dihydroxy - 11,20 - diketo-12(α)-bromopregnane (VI) from bromide a (III) or bromide b (IV).—236 mg. (0.4 mm.) of either pure bromide a or pure bromide b is dissolved in 2 cc. of 80 per cent pyridine at room temperature. After 15 minutes from the time of mixing the colorless solution is poured into 2 cc. of 10 N H₂SO₄ and ice. It is filtered off and washed thoroughly with water, then dried. The dry reaction product is dissolved in acetic acid and water is added carefully. 142 mg. of small needles are obtained as the first, and 31 mg. as the second crop, a yield of 89 per cent. For analysis the first crop is once more recrystallized from dilute acetic acid, M. P. 120–140° with decomposition. When placed on the stage at 147° it melts at 149–51° with decomposition, $(α)_D = +28°$. As the yellow color appears in the chloroform solution the rotation drops to $(α)_D +26°$ (calculated as glyoxal).

3(α) - acetoxy - 21,21 - dimethoxy - 11,20 - diketo-12(α)-bromopregnane (XI) from 3(α)-acetoxy -21,21- dihydroxy -11,20 - diketo -12(α)- bromopregnane (VI).—100 mg. of crystalline hydrate of the glyoxal (VI) is dissolved in warm benzene, the solvent taken down to dryness in vacuum, the residue again dissolved in boiling benzene and concentrated in vacuum. This process is repeated once more. The benzene-free residue is now refluxed with 4 cc. MeCH, 0.25 normal with dry HCl for 2 hours. It is cooled and an excess Na₂CO₃ solution and ice are added. It is extracted with chloroform, and the extract is washed until neutral, dried over sodium sulfate and evaporated. The residue is dissolved in 1 cc. dry pyridine and 1 cc. acetic anhydride added. After 2.5 hours at room temperature, ice is added. After about a half hour it is extracted with chloroform, the extract washed once with dilute HCl, then with NaHCO₃ and with water, dried and evaporated. The residue is dissolved in methanol and water is added to turbidity. This is filtered through infusorial earth. More water is added to the filtrate, causing the acetal to crystallize, weight 41 mg., M. P. 152–57°. After one recrystallization from dilute acetone crystals are in the form of hair-like needles, weight 32 mg., M. P. 157–159°. The crystals show no melting point depression with the compound prepared from the triacetate.

3(α),21,21 - triacetoxy - 11,20 - diketo - 12(α)-bromopregnane (VII) from 3(α)-acetoxy-21,21-dihydroxy - 11,20 - diketo - 12(α) - bromopregnane (VI).—100 mg. of crystalline glyoxal hydrate (VI) is dissolved with warming in 2 cc. acetic anhydride. The yellow solution is then cooled with ice and 1 drop concentrated H₂SO₄ added. The color disappears within 2 seconds. After a half minute ice is added. It is kept at room temperature until the acetic anhydride is all decomposed, then it is filtered and thoroughly washed with water. Weight of the dried material, 114 mg. (theoretical 117 mg.), M. P. 156–64°. The crude material is recrystallized twice from a little methanol, yield 90 mg. (77 per cent), M. P. 167–68°. The crystals give no melting point depression with the triacetate obtained from the 21-bromo compounds.

3(α) - acetoxy - 20 - hydroxy - 11 - keto - 12(α) - bromo-$\Delta^{17,20}$-pregnene-21-al (X) from 3(α)-acetoxy - 21,21-dihydroxy - 11,20 - diketo - 12(α)-bromopregnane (VI).—1.30 gm. of crystalline 3(α) - acetoxy - 21,21 - dihydroxy - 11,20 - diketo-12(α)-bromopregnane (VI) is dissolved in 20 cc. of a mixture of 4 parts of glacial acetic acid and 1 part of pyridine. This is heated at 60° for 16 hours. It is then poured into excess mineral acid and ice. The precipitate is filtered and washed thoroughly with water. The dry material weighs 1.09 gm. It has an absorption band in the ultraviolet light with a maximum at 284 mμ, Σ=6,200 (chloroform). To separate the light-absorbing compound from by-products it is dissolved in benzene and passed through a column containing a mixture of 18 gm. magnesium silicate and 18 gm. infusorial earth. The material which is eluted with the first 500 cc. of benzene crystallizes on the addition of methanol and has an extinction coefficient Σ=10,900. After several recrystallizations from dilute acetone the crystals melt at 190–91° and have λ max.=284 mμ, Σ=13,650 (chloroform) and $(α)_D = +96°$.

The compound reduces ammoniacal silver solution and shows a greenish brown color when a drop of alcoholic FeCl₃ solution is added to its solution in alcohol. With tetranitromethane it gives a weakly positive reaction. In chloroform solution it reacts with 1 mole of bromine within 15 minutes.

When the time of the reaction is varied, the following yields are obtained, based on the light absorption at 284 mμ, 4 hours, 34% of X
7 hours, 40% of X
16 hours, 45% of X
32 hours, 39% of X An increase in the rate of formation of X is noted when the amount of acetic acid is reduced; thus, with a mixture of equal parts of acetic acid and pyridine, the following values are found at 60°

4 hours, 40% of X
7 hours, 45% of X while in pyridine alone the yields are decreased.

3(α),20 - diacetoxy - 11 - keto - 12(α) - bromo - $\Delta^{17,20}$-pregnene-21-al (XIII) from 3(α)-acetoxy-20 - hydroxy - 11 - keto - 12(α)-bromo - $\Delta^{17,20}$ - pregnene-21-al (X).—234 mg. of X are dissolved in 5 cc. pyridine and 5 cc. acetic anhydride. After 1 hour at room temperature it is taken to dryness under reduced pressure. The residue is dissolved in a little chloroform, ligroin is added and the mixture concentrated until it began to become turbid. It crystallizes soon in leaflets, yield 229 mg., M. P. 158–61°. On two recrystallizations from dilute actone the melting point is constant at 162–64°. $(α)_D = +86°$. The pure compound shows an absorption band with maximum at 249 mμ in methanol, but the absorption decreases continuously. When taken in ether the maximum is at 246 mμ, Σ=12,500. It reduces ammoniacal silver nitrate and takes up bromine though at a much slower rate than the free enol.

$3(\alpha),20$ - *diacetoxy* - *11* - *keto* - $12(\alpha)$ - *bromo* - $\Delta^{17,20}$-*pregnene-21-al (XIII) from bromide a (III) or bromide b (IV)*.—59.0 mg. of either pure bromide $a$ or pure bromide $b$ is dissolved in 1.0 cc. of a mixture of 3 parts acetic acid and 1 part pyridine and allowed to stand at room temperature for 45 hours. It is then diluted with benzene, washed with water, dilute HCl, water, sodium bicarbonate solution and again with water, and dried over sodium sulfate. After removal of the benzene, the residue is dissolved in ether and the light absorption determined. The two maxima at 245 mμ and 283 mμ indicate that 51 per cent of the bromide has been converted to the enol acetate XIII while 11 per cent is the free enol X. When the relation of acetic acid to pyridine is varied but the other conditions, i. e., total volume, time and temperature are kept constant, the following results are obtained:

| Solvents used | | Reaction products formed | |
|---|---|---|---|
| Acetic acid | Pyridine | Enol, acetate, per cent | Enol, per cent |
| 100 | 0 | 0 | 0 |
| 90 | 10 | 40 | 3 |
| 75 | 25 | 51 | 11 |
| 50 | 50 | 29 | 34 |

When the time of the reaction is extended to five days, the amount of enol acetate generally decreases, while that of the enol increases.

$3(\alpha),20,21,21$ - *tetraacetoxy* - *11* - *keto* - $12(\alpha)$ - *bromo* - $\Delta^{17,20}$ - *pregnene (XIV) from* $3(\alpha),20$ - *diacetoxy* - *11* - *keto* - $12(\alpha)$ - *bromo* - $\Delta^{17,20}$ - *pregnene-21-al (XIII)*.—206 mg. enol acetate (XIII) is dissolved in 4 cc. acetic anhydride. It is cooled with ice and 2 drops of concentrated sulfuric acid are added. After a half minute ice is added and the mixture allowed to stand at room temperature until all acetic anhydride is decomposed and the material can be filtered. It is washed with water and dried. The crude product weighs 236 mg. and melts at 93–115°. It is crystallized from a little acetone and petroleum ether. Yield, 172 mg., M. P. 150–52°. After three recrystallizations from dilute acetone, it melts at 154–55° (long needles). $(\alpha)_D=+60°$. The crystals absorb one mole $Br_2$ within three hours.

$3(\alpha)$ - *acetoxy* - *21,21* - *dihydroxy* - *11,20* - *diketo* - $12(\alpha),17$ - *dibromopregnane (IX) from* $3(\alpha),21$ - *diacetoxy* - *11,20* - *diketo* - $12(\alpha)$ - *bromopregnane (I)*.—10.22 gm. of I (20 mm.) is dissolved in 500 cc. glacial acetic acid which contain 12.5 cc. bromine and 0.1 mole of dry hydrogen bromide. After 4 days at room temperature the solution is concentrated under reduced pressure to about 75 cc., 50 cc. 80 per cent acetic acid are added and removed under reduced pressure. The remainder is mixed with 50 to 75 cc. of benzene. When water is added white crystals separate at the interphase. Yield 3.4 gm. The material is purified by recrystallizing it several times from dilute acetic acid until the melting point is 206–08° with decomposition when placed on the stage at 203°. $(\alpha)_D=-34.5°$. The solution soon turns yellow and the rotation changes to $(\alpha)_D=-37°$ (calculated as glyoxal).

$3(\alpha),21,21$-*triacetoxy-11,20-diketo-12(α)17* - *dibromopregnane (VIII) from* $3(\alpha),acetoxy-21,21$-*dihydroxy-11,20-diketo* - $12(\alpha),17$ - *dibromopregnane (IX)*.—50 mg. of IX is dissolved in 2 cc. acetic anhydride and 1 drop of concentrated sulfuric acid added. After a half minute the mixture is poured on ice. When all acetic anhydride is decomposed it is filtered and washed thoroughly with water. After drying the material is recrystallized first from a little methanol, M. P. 158–163°, then twice from dilute acetone when the melting point is constant at 167–69°.

$(\alpha)_D=-24°$.

$3(\alpha),20$-*dihydroxy-11-keto-12(α)-bromo-*$\Delta^{17,20}$-*pregnene-21-al(XV) from* $3(\alpha)$-*acetoxy-21,21-dihydroxy* - *11,20* - *diketo* - $12(\alpha),17$ - *dibromopregnane (IX)*.—1.128 g. of IX (2 millimoles) is dissolved in 20 cc. warm methanol, 1.04 gm. (10 millimoles) of solid sodium bisulfite is added first, then slowly and with warming, 40 cc. water. The initial turbidity disappears as the solution becomes hot. After 3–4 minutes at the boiling temperature crystals separate, weight 770 mg., M. P. 179–80° $(\alpha)_D=+90°$. After several recrystallizations from dilute acetone, M. P. 189.5–91°

$(\alpha)_D=+101°$

λ max.=284 mμ; Σ=10,900 in methanol.

$3(\alpha),21$-*diacetoxy* - *11,20* - *diketo-12(α)-bromo-21(α)-chloropregnane (XVI) from* $3(\alpha)$-*acetoxy-21,21* - *dihydroxy-11,20-diketo-12(α)-bromopregnane (VI)*.—337 mg. of VI is dissolved in 3 cc. acetyl chloride and 3 drops concentrated $H_2SO_4$ added. It is allowed to stand at room temperature for 1 hour, mixed with chloroform and shaken vigorously with ice. The chloroform layer is washed with water, sodium bicarbonate solution and again with water, and dried over sodium sulfate. The chloroform solution after being concentrated to about 1 per cent shows a specific rotation $(\alpha)_D=+31°$. On further concentration and addition of ligroin, 173 mg. of crystals hereinafter referred to as chloride $a$ compound XVI are obtained, M. P. 160–78°, $(\alpha)_D=+63°$. Several recrystallizations from dilute acetone raise the melting point to a constant value of 189–91° and the rotation to $(\alpha)_D=+88°$. From the mother liquor a crop of crystals is obtained with $(\alpha)_D=-4°$ which on several recrystallizations gives pure chloride $b$ with M. P. 153–54° and $(\alpha)_D=-35°$.

$3(\alpha)$ - *acetoxy-21,21-dihydroxy* - *11,20* - *diketo-* $12(\alpha)$ - *bromopregnane (VI) from chloride a (XVI)*.—29 mg. of pure chloride $a$ is suspended in 0.5 cc. 80% pyridine. The crystals are in solution after ten minutes at room temperature. Twenty minutes later benzene is added and the mixture washed with excess sulfuric acid.

The benzene extract is washed with sodium bicarbonate and water and is taken to dryness. The residue is crystallized from dilute acetic acid, yield 23 mg. (89%), M. P. 148–49°, with yellow color.

All of the compounds I to XVI shown in the foregoing flow sheet, all of which excepting compound XII contain an α-acetate group at position 3, ketone at position 11 and α-bromine at position 12 are new. As is apparent, other acyloxy groups may be substituted for acetoxy at position 3 and chlorine may be substituted for the bromine at 12. Likewise, other acyloxy groups may be substituted for acetoxy and chlorine for bromine at positions 17, 20 and 21.

This application is a continuation-in-part of our application Serial No. 114,462, filed September 7, 1949, now Patent No. 2,563,247.

We claim:

1. Compounds of the general formula

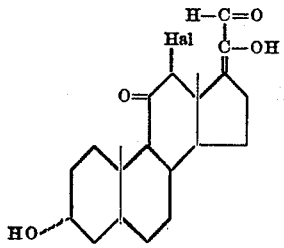

wherein Hal stands for a halogen of the group consisting of chlorine and bromine.

2. $3(\alpha),20$ - dihydroxy-11-keto - $12(\alpha)$ - bromo-$\Delta^{17,20}$-pregnene-21-al.

3. The method which comprises heating a $3(\alpha)$-acyloxy - 21,21 - dihydroxy-11,20 - diketo -$12(\alpha)$- halo-17-bromopregnane with an aqueous solution of an alkali metal bisulfite to produce a $3(\alpha),20$-dihydroxy - 11-keto-12-$(\alpha)$ - halo-$\Delta^{17,20}$-pregnene 21-al.

4. The method as defined in claim 3 in which the bisulfite is sodium bisulfite.

5. The method which comprises heating $3(\alpha)$-acetoxy - 21,21-dihydroxy - 11,20 - diketo-$12(\alpha)$,-17-dibromopregnane with an aqueous solution of an alkali metal bisulfite to produce $3(\alpha),20$-dihydroxy-11-keto-$12(\alpha)$-bromo-$\Delta^{17,20}$-pregnene - 21-al.

EDWARD C. KENDALL.
GERARD A. FLEISHER.

No references cited.